(12) United States Patent
Leigh et al.

(10) Patent No.: US 9,465,179 B2
(45) Date of Patent: Oct. 11, 2016

(54) OPTICAL BASE LAYER

(75) Inventors: Kevin B. Leigh, Houston, TX (US);
George D. Megason, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 118 days.

(21) Appl. No.: 14/391,352

(22) PCT Filed: Apr. 30, 2012

(86) PCT No.: PCT/US2012/035822
§ 371 (c)(1),
(2), (4) Date: Oct. 8, 2014

(87) PCT Pub. No.: WO2013/165356
PCT Pub. Date: Nov. 7, 2013

(65) Prior Publication Data
US 2015/0323754 A1    Nov. 12, 2015

(51) Int. Cl.
*G02B 6/42* (2006.01)
*G02B 6/43* (2006.01)
*G02B 6/36* (2006.01)
*G02B 6/38* (2006.01)

(52) U.S. Cl.
CPC .............. *G02B 6/43* (2013.01); *G02B 6/3608* (2013.01); *G02B 6/3897* (2013.01); *G02B 6/4231* (2013.01); *G02B 6/4293* (2013.01)

(58) Field of Classification Search
None
See application file for complete search history.

(56) References Cited

U.S. PATENT DOCUMENTS

| 5,371,820 | A   | 12/1994 | Welbourn et al. |
| 5,521,992 | A   | 5/1996  | Chun et al. |
| 6,845,184 | B1  | 1/2005  | Yoshimura et al. |
| 7,561,763 | B2  | 7/2009  | Kiani et al. |
| 7,583,871 | B1* | 9/2009  | Bchir ................. G02B 6/4201 385/14 |
| 7,606,458 | B2  | 10/2009 | Hermsen |
| 7,811,139 | B1  | 10/2010 | Parikh et al. |
| 2002/0097962 | A1* | 7/2002 | Yoshimura .......... G02B 6/10 385/50 |
| 2004/0037512 | A1* | 2/2004 | Cho .................. G02B 6/42 385/88 |
| 2005/0089027 | A1 | 4/2005 | Colton |

(Continued)

FOREIGN PATENT DOCUMENTS

| CN | 101344624 | 1/2009 |
| CN | 101387722 | 3/2009 |

(Continued)

OTHER PUBLICATIONS

Bierhoff, T. et al., All Optical Pluggable Board-backplane Interconnection System Based on an MPXTM-FlexTail Connector Solution, (Research Paper), IEEE 2010 Photonics Society Winter Topical Meetings, Jan. 11-13, 2010, 4 Pages.

(Continued)

*Primary Examiner* — Hemang Sanghavi
(74) *Attorney, Agent, or Firm* — Vancott

(57) ABSTRACT

An optical base layer (OBL) (102) comprises a number of waveguides (124) disposed inside the OBL (102), and a number of socket connectors (116, 120) formed on the optical base layer and extending through a motherboard (104) to optically couple the OBL (102) to a number of components disposed on the motherboard (104). An optical base layer (OBL) (102) comprises a number of adjustable arms (1105), and a number of waveguides disposed within the adjustable arms (1105), in which the position of the adjustable arms (1105) are altered to accommodate different motherboard (104) configurations.

14 Claims, 13 Drawing Sheets

(56) References Cited

U.S. PATENT DOCUMENTS

| | | | |
|---|---|---|---|
| 2006/0098914 A1* | 5/2006 | Tourne | G02B 6/3825 385/14 |
| 2008/0013880 A1* | 1/2008 | Pitwon | G02B 6/43 385/14 |
| 2010/0054671 A1* | 3/2010 | Ban | G02B 6/43 385/88 |
| 2010/0129036 A1 | 5/2010 | Hodono | |

FOREIGN PATENT DOCUMENTS

| | | | |
|---|---|---|---|
| JP | 2002323627 A | * | 11/2002 |
| JP | 2012083488 A | * | 4/2012 |

OTHER PUBLICATIONS

International Searching Authority, The International Search Report and the Written Opinion, Dec. 26, 2012, 8 Pages.

Vaughan, D. et al., Applications for Embedded Optic Modules in Data Communications (Research Paper), Jun. 10, 2011, 8 Pages.

* cited by examiner

OPTICAL BASE LAYER

BACKGROUND

In computer systems and computer modules, high speed electrical signal traces on printed circuit boards (PCBs) interconnect a number of electronic components such as, for example, application specific integrated circuits (ASICs) and associated connectors. As the signaling rate increases in these computer systems and computer modules, optical transceiver modules may be better suited than their electrical counterparts for high speed connectivity for smaller component and connector packaging, lower power consumption, and longer signal path lengths. Varying ratios of electrical and optical signals may be used to interconnect ASIC and associated connector components within the computer systems and computer modules.

A number of waveguides may be included within the computer systems and computer modules. These waveguides may comprise unorganized and unprotected optical fibers that may reduce system reliability, increase air flow blockage within the computer systems and computer modules resulting in high manufacturing and servicing costs. Further, optical signals routing across the entire depth of a computer system may include varying system designs with different optical connectivity. However, the same electrical connectivity may include different ground-up designs at higher costs.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
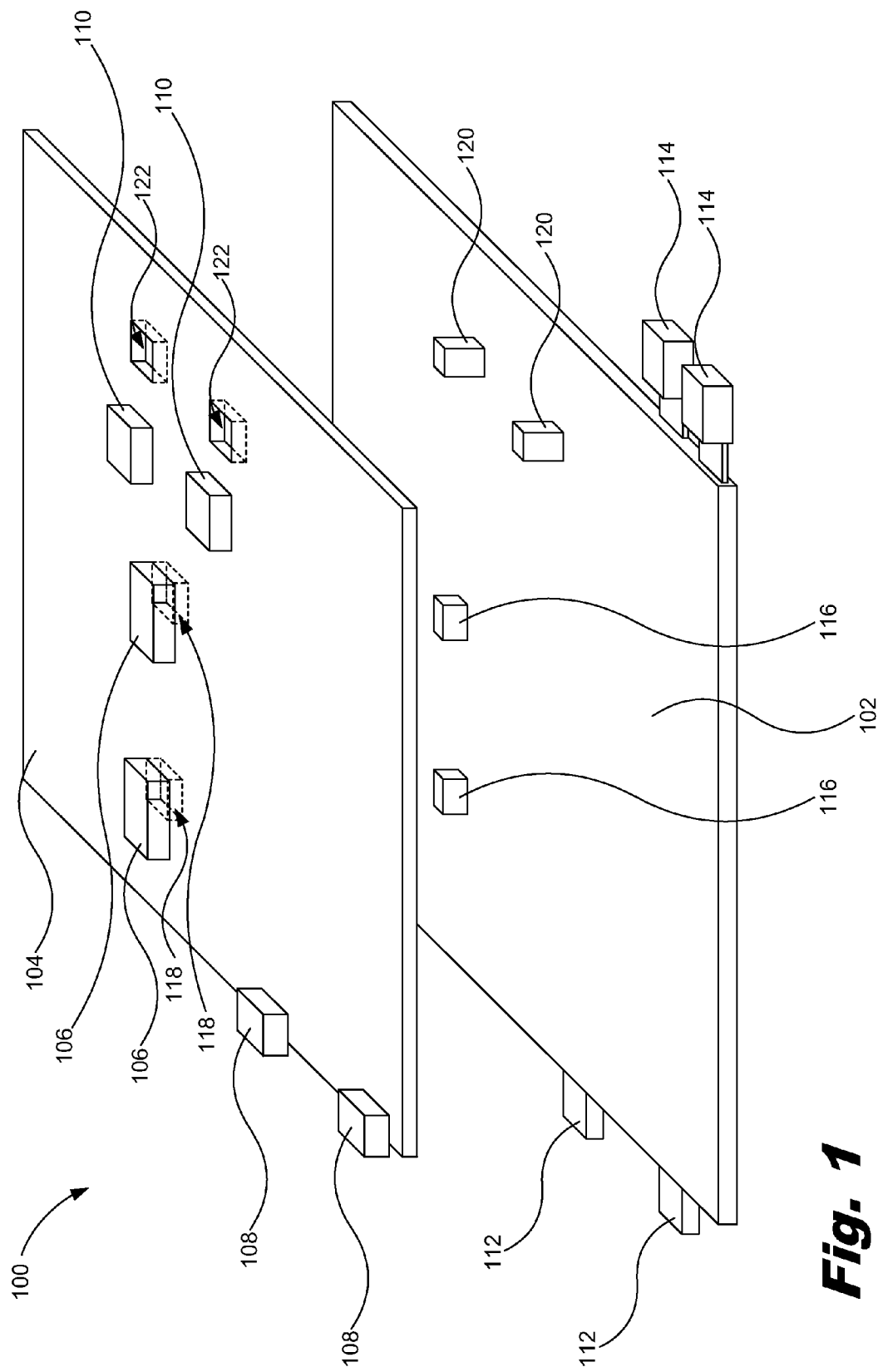
FIG. 1 is an isometric exploded diagram of an optical base layer (OBL) and an electrical motherboard of a computing device, according to one example of the principles described herein.

The above-described computer systems and computer modules are associated with exposed optical fibers above PCBs, including inflexible fiber routing, potential connectivity reliability issues related to exposed optical fibers, airflow blockage and difficult and costly manufacturing processes. Further, the above situation may make it more difficult to test the system module sub-assemblies with exposed and unorganized optical fibers. The above shortfalls are exponentially higher as the numbers of component types and optical fibers within the system module grow.

The present specification and drawings describe an optical base layer (OBL). The OBL comprises a number of waveguides disposed inside the OBL, and a number of optical socket connectors formed on the OBL and extending through a motherboard to optically couple the OBL to a number of components disposed on the motherboard.

As used in the present specification and in the appended claims, the term "waveguide" is meant to be understood broadly as any structure that propagates optical signals. Examples of waveguides include hollow metallic waveguides having rectangular, circular, or elliptical cross-sections, planar waveguides, channel waveguides, ridge waveguides, optical glass fibers, optical plastic fibers, optical buses using plastic optical waveguides, polymer waveguides, rigid waveguides, flexible waveguides, and molded waveguides, among others. The waveguides may be used to transmit optical signals in a point-to-point manner or in a multi-drop manner such as in the case of an optical bus.

Further, as used in the present specification and in the appended claims, the term "computing device" is meant to be understood broadly as any device, component, or sub-component that processes data. Examples of computing devices may include a server, a blade server, a computer blade, a storage blade, a switch module, and a personal computer, among others.

Still further, as used in the present specification and in the appended claims, the term "e/o engine" is meant to be understood broadly as any computer hardware device that converts electrical signals into optical signals, optical signals into electrical signals, or both. In one example, an e/o engine may receive an optical or electrical signal from a first computing device, convert that signal into either an electrical signal or an optical signal, and transmit that converted signal to a second computing device.

Even still further, as used in the present specification and in the appended claims, the term "hot swappable," or "hot pluggable" are meant to be understood broadly as a characteristic of computing device components that can be replaced without shutting down the computing device. In another example, hot swappable may describe the ability to replace computing device components without interruption to the computing device. In another example, hot pluggable may describe the addition of computing device components that would expand the computing device without significant interruption to the operation of the computing device.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 2:
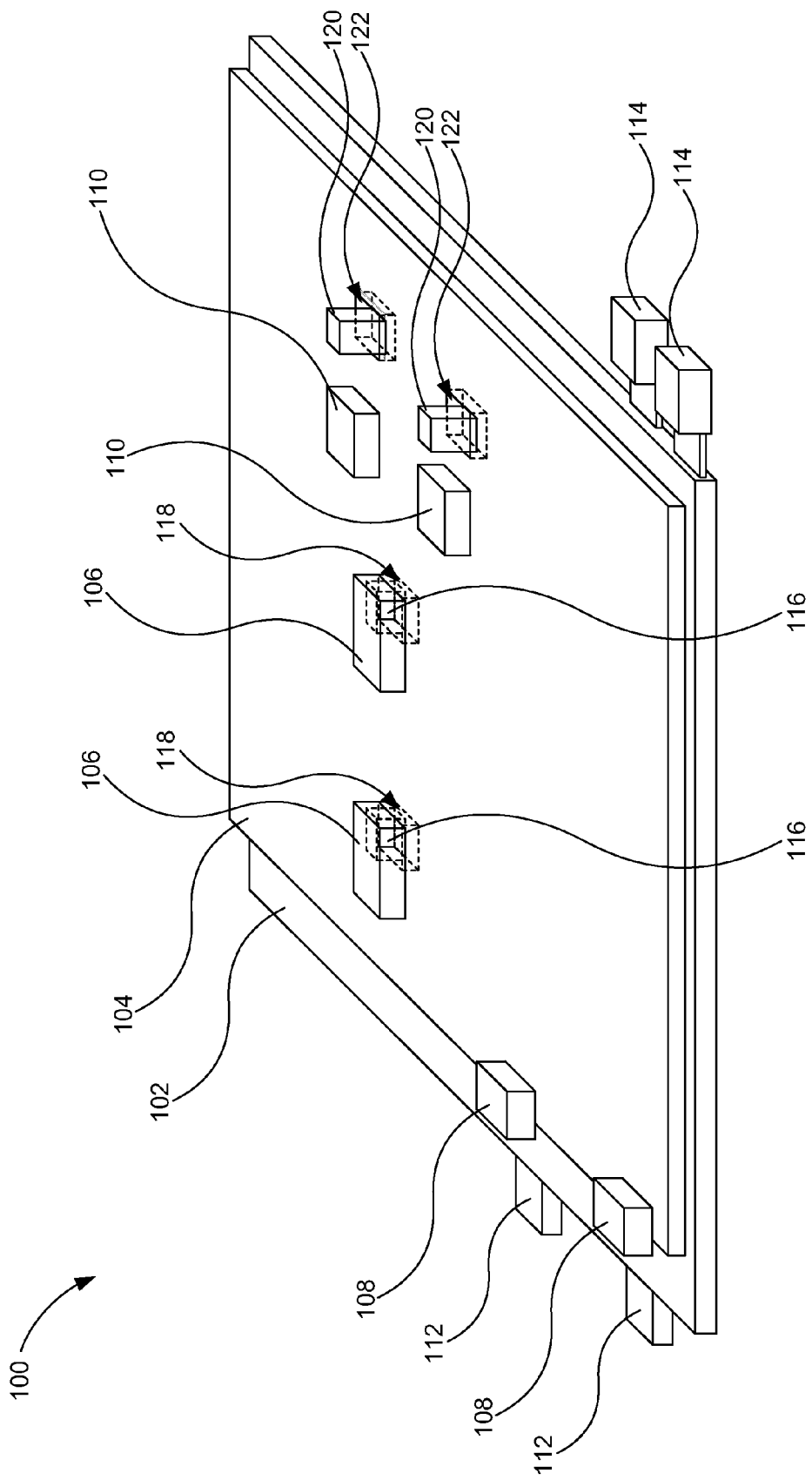
FIG. 2 is an isometric diagram of the OBL and the electrical motherboard of FIG. 1 in which the OBL and motherboard are engaged, according to one example of the principles described herein.

FIG. 1 is an isometric exploded diagram of an optical base layer (OBL) (102) and electrical PCB (motherboard) (104) of a computing device (100), according to one example of the principles described herein. FIG. 2 is an isometric diagram of the OBL (102) and motherboard (104) of FIG. 1 in which the OBL (102) and motherboard (104) are engaged, according to one example of the principles described herein. The motherboard (104) comprises a number of components including, for example, a number of processing devices (106), a number of electrical pluggable module connectors (108), and a number of electrical mezzanine connectors (110). The processing devices (106) may be any data processing device such as, for example, microprocessors, memory controllers, graphic processing units (GPU), application specific integrated circuits (ASICs), leaf switch ASICs, spine switch ASICs, and line card switch ASICs, among others. Other components such as, for example, storage devices and network adaptors, among others may also be included as additional components within the computing device (100). These storage devices and network adaptors may be interconnected with a number of other components within the computing device (100) as will be described below. However, the processing devices (106) are depicted here as examples only.

The electrical pluggable module connectors (108) electrically couple pluggable modules to the motherboard (104). In one example, the electrical pluggable module connectors (108) may be electrical blind-mate connectors. The electrical mezzanine connectors (110) electrically couple mezzanine cards to the motherboard (104). In one example, the electrical mezzanine connectors (110) may be electrical blind-mate connectors. The pluggable modules and mezzanine cards will be described in more detail below in connection with FIG. 4.

The OBL (102) comprises a number of optical pluggable module connectors (112), and a number of optical backplane connectors (114). The optical pluggable module connectors (112) optically couple pluggable modules to the various components coupled to the motherboard (104). In one example, the optical pluggable module connectors (112) may be optical blind-mate connectors. As will be described in more detail below, the optical pluggable module connectors (112) are each associated with and match an electrical pluggable module connector (108). In this manner, a pluggable module comprising electrical and optical connections may be both electrically and optically coupled to the computing device (100). The optical backplane connectors (114) optically couple the computing device (100) to an external optical signal source such as an external computing device. In one example optical backplane connectors (114) may be optical blind-mate connectors.

The OBL (102) further comprises a number of tunneling optical processing device socket connectors (116) coupled to or formed on the OBL (102). In one example, the optical processing device socket connectors (116) may be optical blind-mate connectors. The optical processing device socket connectors (116) match a number of processing device socket voids (118) defined within the motherboard (104). The processing device socket voids (118) of FIGS. 1 and 2 are depicted as dashed lines because the processing device socket voids (118) are located under the processing devices (106) and are formed within the motherboard (104). The OBL (102) further comprises a number of tunneling optical mezzanine socket connectors (120) coupled to or formed on the OBL (102). In one example, the optical mezzanine socket connectors (120) may be optical blind-mate connectors. The optical mezzanine socket connectors (120) match a number of mezzanine socket voids (122) defined within the motherboard (104).

The OBL (102) may be made out of any material in which a waveguide (FIG. 3, 124) may be embedded or formed. In one example, the OBL (102) is made of a polymer in which a number of waveguides (FIG. 3, 124) are embedded or formed within the polymer. In one example, a number of voids are formed within the OBL (102) and coated with thin, optically reflective material, such as, for example, an approximately 2,000 Angstroms of gold, silver, or titanium coat with a silicon dioxide as a dielectric protective layer. In this example, a hollow metal waveguide is formed within the OBL (102). In another example, a number of optical fibers are embedded within the OBL (102) during or after the formation of the OBL (102). In another example, a number of electrically conductive pathways may also be embedded within the OBL (102) to provide electrical communication between components within the computing device (100). In one example, power is distributed to the electrically conductive pathways within the OBL (102) from the motherboard (104) via an electrical interface between the motherboard (104) and the OBL (102).

In still another example, the OBL may be a sheet of pre-printed flexible optical fibers or waveguides with rigid supports for each connector. In this example, the OBL (102) may comprise a rigid backing such as the substrate (1306) in the example of FIG. 13 described below or another type of rigid support. Thus, the examples of OBLs (102) described throughout this disclosure may comprise waveguides formed or embedded within rigid conduits, within flexible sheet OBLs, within semi-flexible sheet OBLs, or a combination thereof. Further, as will be described in more detail below, a computing device (100) may comprise a number of OBLs (102) acting as either main OBLs or OBL segments optically coupled to a main OBL. Still further, the OBLs of the present disclosure provide optical connectivity among components mounted on the motherboard, pluggable modules, backplane connectors, and faceplate connectors, among others.

As depicted in FIG. 2, when the OBL (102) and motherboard (104) are engaged, the optical processing device socket connectors (116) and optical mezzanine socket connectors (120) align with and enter the processing device socket voids (118) and mezzanine socket voids (122), respectively. In this manner, the optical processing device socket connectors (116) and the optical mezzanine socket connectors (120) serve as position referencing elements. When the OBL (102) and motherboard (104) are engaged as depicted in FIG. 2, the corresponding electrical and the optical connector pairs for a number of pluggable modules, adapter cards, ASICs, and mezzanine cards optically and electrically align in a predetermined manner. In one example, these pluggable modules, adapter cards, ASICs, and mezzanine cards may electrically and optically couple to the OBL (102) and motherboard (104) simultaneously. Thus, the optical processing device socket connectors (116) and the optical mezzanine socket connectors (120) serve two purposes. The first is to provide optical transmission from the OBL (102), through the motherboard (104) to additional components. The second purpose is to align components within the computing device (100).

Figure 3:
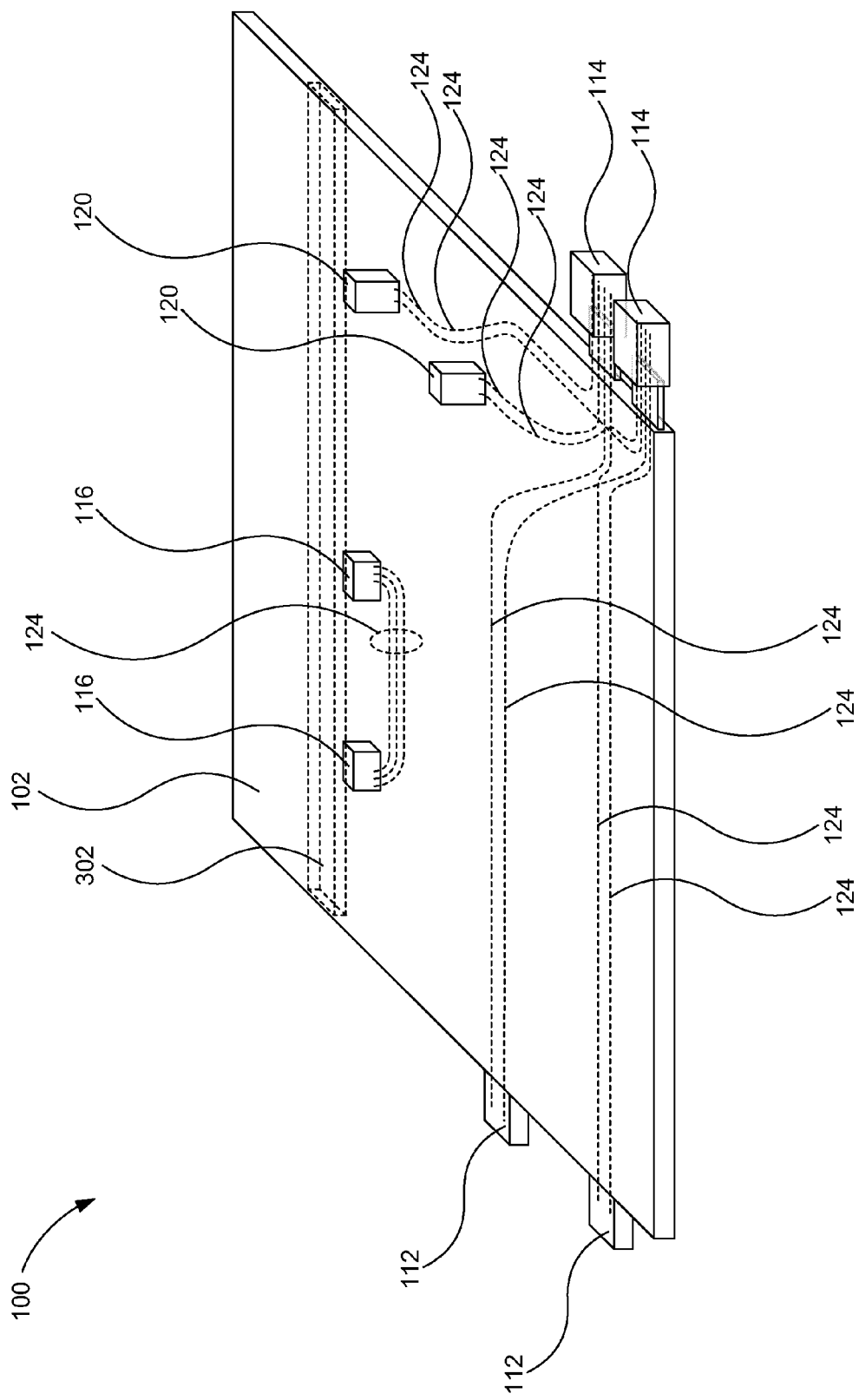
FIG. 3 is an isometric diagram of the optically coupled OBL and the electrical motherboard of FIG. 2 including a number of optical fibers within the OBL, according to one example of the principles described herein.

FIG. 3 is an isometric diagram of the optically coupled OBL (102) of FIG. 2 including a number of optical fibers (124) within the OBL (102), according to one example of the principles described herein. The optical fibers (124) embedded within the OBL (102) optically couple the optical pluggable module connectors (112), optical backplane connectors (114), optical processing device socket connectors (116), and optical mezzanine socket connectors (120) to each other. The configuration of optical fibers (124) within the OBL (102) depicted in FIG. 3 is an example of optical interconnectivity between the optical pluggable module connectors (112), optical backplane connectors (114), optical processing device socket connectors (116), and optical mezzanine socket connectors (120). Other configurations may be employed for different applications of optical signal transmission.

The optical fibers (124) embedded within the OBL (102) also optically couple the various components within the computing device (100) such as, for example, ASICs, leaf switch ASICs, spine switch ASICs, line card switch ASICs, pluggable modules, and mezzanine cards, among others. An e/o engine may be used between the optical fibers (124) and these components in order to convert the optical signals transmitted via the optical fibers (124) into electrical signals to be utilized by the components. In another example, optical waveguides of any type may be embedded in the OBL (102) to transmit optical signals to the various components within the computing device (100). For example, a number of hollow metallic waveguides having rectangular, circular or elliptical cross-sections, planar waveguides, channel waveguides, ridge waveguides, dielectric waveguides, optical glass fibers, optical plastic fibers, optical buses using plastic optical waveguides, polymer waveguides, rigid waveguides, flexible waveguides, molded waveguides, optical fibers, and combinations thereof may be embedded or formed within the OBL (102). In another example, a number of conductive pathways may also be embedded within the OBL (102) to provide electrical communication between components within the computing device (100).

The OBL (102) may further comprise a number of cooling channels (302) defined within the OBL (102). As will be described in more detail below, a number of electrical components may be embedded within the OBL (102) including, for example, processing devices, optical switches, and data storage devices, among others. The cooling channels formed in the OBL (102) allow for cooling air to pass over or in the area of these embedded electrical components to cool the embedded electrical components. One cooling channel (302) is depicted within the OBL (102) of FIG. 3. However, any number of cooling channels may be defined within the OBL (102) to cool these embedded components. Further, the cooling channels (302) may have any cross-sectional shape such as, for example, rectangular, square, or elliptical cross-sections.

Figure 4:
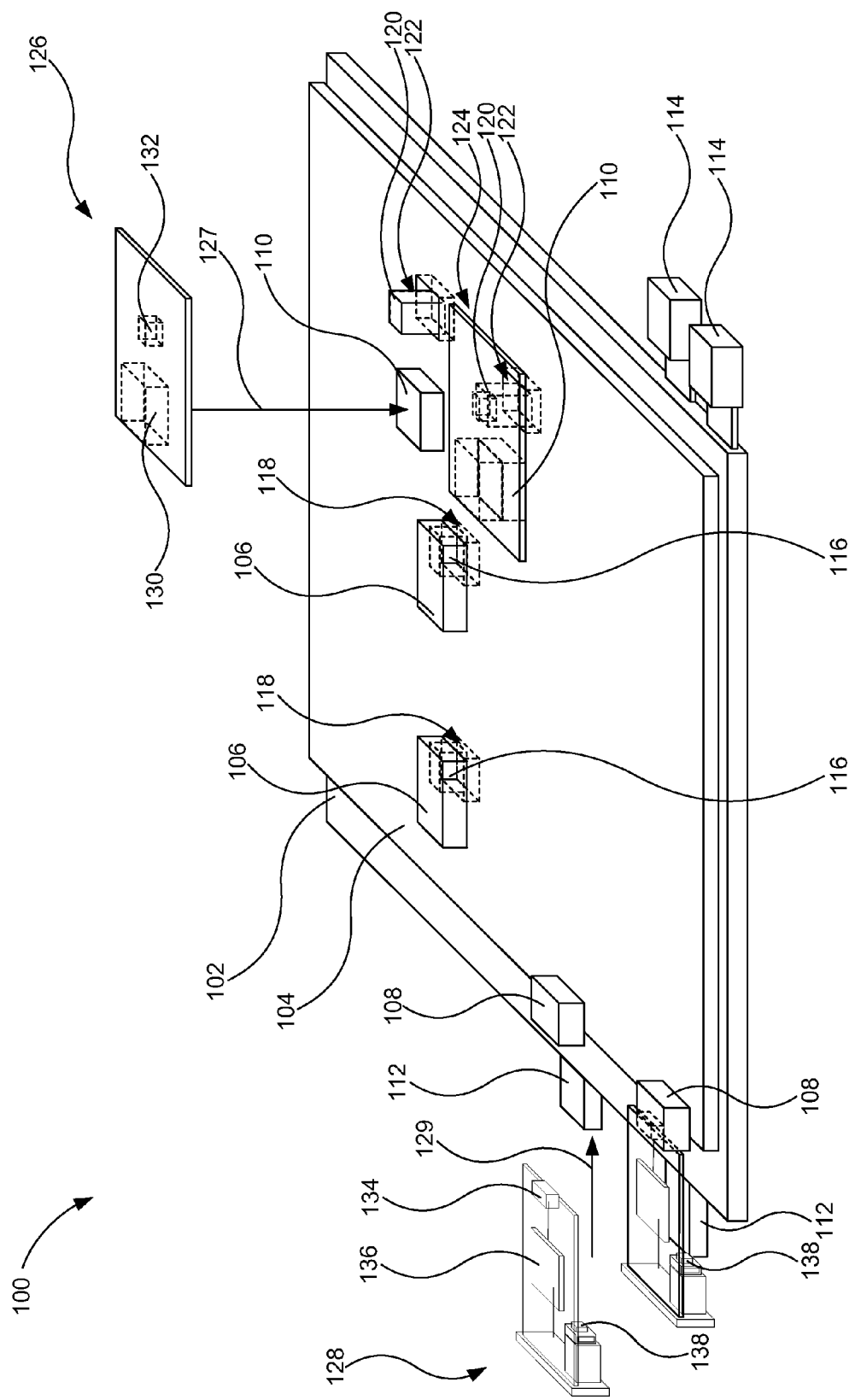
FIG. 4 is an isometric diagram of the optically coupled OBL and the electrical motherboard of FIG. 2 including a number of mezzanine cards and pluggable modules, according to one example of the principles described herein.

FIG. 4 is an isometric diagram of the optically coupled OBL (102) and motherboard (104) of FIG. 2 including a number of mezzanine cards (126) and pluggable modules (128), according to one example of the principles described herein. In one example, the mezzanine cards (126) comprise a number of components used to expand the basic functionality of the computing device (100). These components of the mezzanine cards (126) may serve to increase the computing device's (100) capabilities including, for example, increasing processing abilities, enhancing graphics capabilities, increasing storage, enabling forms of network communications, electrical-optical signal multiplexing, and electrical-optical signal conversion, among other functions. The mezzanine cards (126) also comprise plugs, sockets, pins, connectors, nuts, latches, or other fasteners to couple the mezzanine cards (126) to the motherboard (104). FIG. 4 depicts one mezzanine card (124) engaged with the OBL (102) and motherboard (104), and another mezzanine card (124) not engaged with the OBL (102) or motherboard (104) so that the details of the mezzanine cards (126) may be described.

The mezzanine cards (124) are engaged with the OBL (102) and motherboard (104) by moving the mezzanine cards (124) in the direction of arrow (127) and securing the mezzanine cards (124) by the fasteners described above. The mezzanine cards (126) comprise electrical mezzanine connectors (130) disposed on a side of the mezzanine cards (126) closest to the motherboard (104) that match the electrical mezzanine connectors (110) disposed on the motherboard (104). It one example, the electrical mezzanine connectors (130) may be electrical blind-mate connectors. The mezzanine cards (126) further comprise optical mezzanine connectors (132) also disposed on a side of the mezzanine cards (126) closest to the motherboard (104).

When the mezzanine cards (126) are coupled to the motherboard (104), the optical mezzanine connectors (132) optically couple to the optical mezzanine socket connectors (120). A mezzanine card may comprise a number of processing devices (not shown) that electrically couple to the electrical mezzanine connectors (130) and optically couple to the optical mezzanine connectors (132). In this manner, the processing devices on the mezzanine cards (126) convert the optical signals transmitted by the optical mezzanine socket connectors (120) into electrical signals, and transmit those electrical signals to the electrical mezzanine connectors (130). Example of processing devices incorporated within the mezzanine cards (126) include network interface controllers (NIC) and electrical-optical signal converters (e/o engines). The electrical mezzanine connectors (130) transmit their electrical signals to their matching electrical mezzanine connectors (110) located on the motherboard (104) for use by components of the motherboard (104).

Electrical signals from the motherboard (104) are converted into optical signals via the processing devices on the mezzanine cards (126) and the optical mezzanine connectors (132) in reverse order. These optical signals may then be transferred from the optical mezzanine socket connectors (120) to other locations on the OBL (102) for use by another component within the OBL (102), other areas of the motherboard (104), or a computing device external to the computing device (100). In one example, the mezzanine cards (126) are hot swappable.

The computing device (100) may further comprise pluggable modules (128). In one example, the pluggable modules (128) comprise a number of components used to expand the basic functionality of the computing device (100). The pluggable modules (128) also comprise plugs, sockets, pins, connectors, screws, latches, or other attachments to couple the pluggable modules (128) to the motherboard (104). FIG. 4 depicts one pluggable modules (128) engaged with the OBL (102) and motherboard (104), and another pluggable modules (128) not engaged with the OBL (102) or motherboard (104) so that the details of the pluggable modules (128) may be described. The pluggable modules (128) are engaged with the OBL (102) and motherboard (104) by moving the pluggable modules (128) in the direction of arrow (129) and securing the pluggable modules (128) by the fasteners described above.

The pluggable modules (128) comprise electrical pluggable module connectors (134) that match the electrical pluggable module connectors (108) disposed on the motherboard (104). In one example, the electrical pluggable module connectors (134) may be electrical blind-mate connectors. In one example, the pluggable modules (128) may further comprise a number of components (136) such as, for example, leaf ASICs, leaf switch ASICs, and NICs, GPUs, storage controllers, among others. These components (136) may serve to increase the computing device's (100) capabilities including, for example, increasing processing abilities, enhancing graphics capabilities, increasing storage, and enabling forms of network communications, among others.

The pluggable modules (128) further comprise e/o engines (138). When the pluggable modules (128) are coupled to the OBL (102) and motherboard (104), the e/o engines (138) optically couple to the optical pluggable module connectors (112). In this manner, the e/o engines (138) of the pluggable modules (128) convert the optical signals transmitted by the optical pluggable module connectors (112) into electrical signals, and transmits those electrical signals to the components (136) and electrical pluggable module connectors (134). The electrical pluggable module connectors (134) transmit their electrical signals to their matching electrical pluggable module connectors (108) for use by components of the motherboard (104).

The electrical signals are converted into optical signals via the e/o engines (138) in reverse order. These optical signals may then be transferred from the optical pluggable module connectors (112) to other locations on the OBL (102) for use by another component within the OBL (102), other portions of the motherboard (104), or a computing device external to the computing device (100). In one example, the pluggable modules (128) are hot swappable.

In the example disclosed in FIG. 4, the mezzanine cards (126) and pluggable modules (128) optically couple to the OBL (102) and electrically couple to the motherboard (104) simultaneously. However, in other examples, the optical and electrical coupling of the mezzanine cards (126) and pluggable modules (128) to the OBL (102) and motherboard (104) may occur in series. For example, the electrical coupling of the mezzanine cards (126) or the pluggable modules (128) to the motherboard (104) may occur before or after the optical coupling of the mezzanine cards (126) or the pluggable modules (128) to the OBL (102).

Although not depicted in FIGS. 1 through 4, the OBL (102) and motherboard (104) may further comprise a number of conductive pathways to electrically couple the various components within the OBL (102) and motherboard (104). In this manner, electrical pathways may exist on the motherboard (104) or may be embedded within the OBL (102). Further, although the OBL (102) is depicted as being positioned below the motherboard (104), in another example, the OBL (102) may be positioned above the motherboard (104).

In one example, the OBL (102) is positioned on a side of the motherboard (104) opposite a number of processing devices or other components that may produce heat during operation. In this example, the OBL (102) manages the routing of the waveguides (124) so that the waveguides are not obstructing cooling air from flowing over the processing devices or other components. Another advantage to placing the OBL (102) with it waveguides (124) on a side opposite the processing devices or other components is so that a user or technicians may access the processing devices or other components without the waveguides (124) obstructing such access and without the possibility of damaging waveguides (124) that may otherwise be present.

Among the components that may be coupled to or formed within the OBL (102), the OBL (102) may include an optical circuit switch to provide for reconfiguration of the waveguides (124). The optical switch couples to a number of the waveguides (124), and enables signals in the waveguides (124) to be selectively switched from one circuit to another. Some examples of optical circuit switches include, for example, micro electro-mechanical system (MEMS) based circuit switches, optical circuit switches that physically shift an optical fiber to drive a number of alternative fibers, electro-optic switches, and magneto-optic switches, among others.

Figure 5:
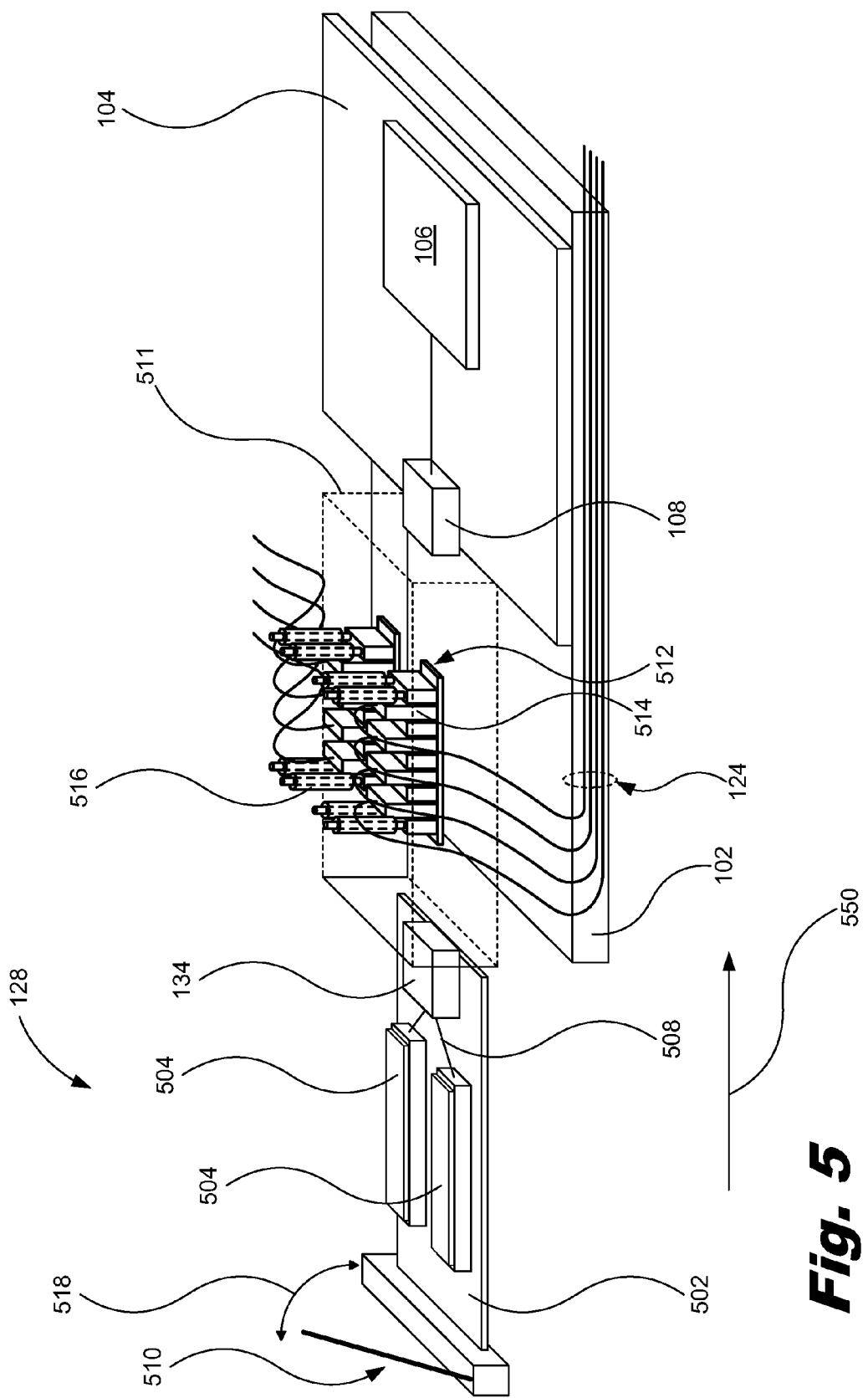
FIG. 5 is a perspective view of a pluggable module in a disengaged arrangement with respect to the electrical motherboard, according to an example of the principles described herein.

FIG. 5 is a perspective view of a pluggable module (128) in a disengaged arrangement with respect to the motherboard (104), according to an example of the principles described herein. As depicted in FIG. 5, the pluggable module (128) comprises a substrate (502), a number of e/o engine arrays (504), an electrical pluggable module connector (134) that matches the electrical pluggable module connector (108) disposed on the motherboard (104), and a number of conductive pathways (508) electrically coupling the e/o engine array (504) to the electrical pluggable module connector (134). The pluggable module (128) further comprises a latching device (510) to couple the pluggable module (128) to the motherboard (104).

In order to couple, house, and mount the pluggable module (128) with respect to the motherboard (104), the motherboard (104) comprises a pluggable module housing (511). The motherboard (104) further comprises a number of ferrule arrays (512) comprising a number of ferrules (514) to transmit optical signals from the optical backplane connectors (114) of FIGS. 1 through 4 to the e/o engine array (504) via, for example, the waveguides (124). A number of heat sinks (516) may be coupled to the ferrule arrays (512) to draw heat from the ferrule arrays (512). The heat sinks (516) may also be utilized as vertical guides to guide the insertion of the ferrules (514) into the ferrule arrays (512). In one example, the ferrule arrays (512), ferrules (514), and heat sinks (516) are coupled to the pluggable module housing (511) in a predefined orientation in order to align the various elements of the pluggable module (128) with the various elements of the motherboard (104) as will now be described.

The pluggable module housing (511) assists in aligning the electrical pluggable module connector (134) and the electrical pluggable module connectors (108) during insertion of the pluggable module (128) into the pluggable module housing (511). In ore example, a number of alignment features may be formed in the pluggable module housing (511) to align the e/o engine arrays (504) with the ferrule arrays (512). As described above, the pluggable module (128) further comprises the latching device (510) to couple the pluggable module (128) to the pluggable module housing (511) and motherboard (104). In one example, the latching device (510) may be any device capable of coupling the electrical pluggable module connector (134) to the electrical pluggable module connectors (108) and the e/o engine arrays (504) to the ferrule arrays (512) simultaneously or in series.

In another example, the latching device (510) may be, for example, a spring-loaded lever that, when pushed in the direction of arrow (518) may cause a number of locks to protrude out of the pluggable module (128) and into the pluggable module housing (511) when the pluggable module (128) is correctly mounted in the pluggable module housing (511). However, any coupling device may be used as the latching device (510).

The pluggable module (128) is pushed into the pluggable module housing (511). In one example, the action of pushing the pluggable module (128) into the pluggable module housing (511) as indicated by arrow (550) electrically couples the electrical pluggable module connectors (134) to the electrical pluggable module connectors (108). In another example, the electrical coupling of the electrical pluggable module connectors (134) to the electrical pluggable module connectors (108) does not occur until a later stage of mounting, as will be described in more detail below.

In one example, during engagement of the latching device (510), and the pluggable module (128) is mounted within the pluggable module housing (511), the pluggable module (128) is forced vertically into optical engagement with the ferrule arrays (512). In this example, the latching device (510) comprises a carriage (not shown) located underneath the substrate (502) that, when activated by the latching device (510), moves the e/o engine arrays (504) of the pluggable module (128) vertically into communicative engagement with the ferrule arrays (512). The carriage may be any mechanical device that positions the e/o engine arrays (504) of the pluggable module (128) into communicative engagement with the ferrule arrays (512) upon engagement of the latching device (510).

In still another example, the latching device (510) engages the electrical pluggable module connectors (134) with the electrical pluggable module connectors (108) simultaneously or substantially simultaneously as the latching device (510) engages the e/o engine arrays (504) with the ferrule arrays (512). In this example, although the electrical pluggable module connectors (134) and the electrical pluggable module connectors (108) may be horizontally aligned due to the right edge of the electrical pluggable module connectors (134) and the left edge of the electrical pluggable module connectors (108) being positioned on the same vertical plane, they may not be vertically aligned in a manner in which electrical communication may take place. Thus, in this example, the engagement of the latching device (510) electrically engages the electrical pluggable module connectors (134) with the electrical pluggable module connectors (108) simultaneously or substantially simultaneously as the latching device (510) optically engages the e/o engine arrays (504) with the ferrule arrays (512).

As depicted in FIG. 5, the waveguides (124) are embedded within the OBL (102). In one example, the waveguides (124) may be optical fibers, or flexible coplanar waveguides. In this example, these waveguides are embedded within the OBL (102). The embedding of the optical fibers within the OBL (102) has several advantages. This configuration protects optical fibers within the OBL (102) and enables higher system reliability. Further, routing the optical fibers within OBL (102) and under the motherboard (104) prevents air flow blockage by the optical fibers that may otherwise be routed above the motherboard (104). Still further, optical fiber cables with minimum sheathing may be used because they are fully contained within an OBL (102), enabling the use of lower cost and smaller volume space fiber assemblies. Even still further, by hiding from view all the optical fiber routing complexity from a user or technician, overall system assembly looks simpler and is easier to maintain. Even still further, users or technicians who attempt to perform maintenance on the computing device (100) will be unable to unintentionally disconnect or damage the optical fibers (124).

Figure 6:
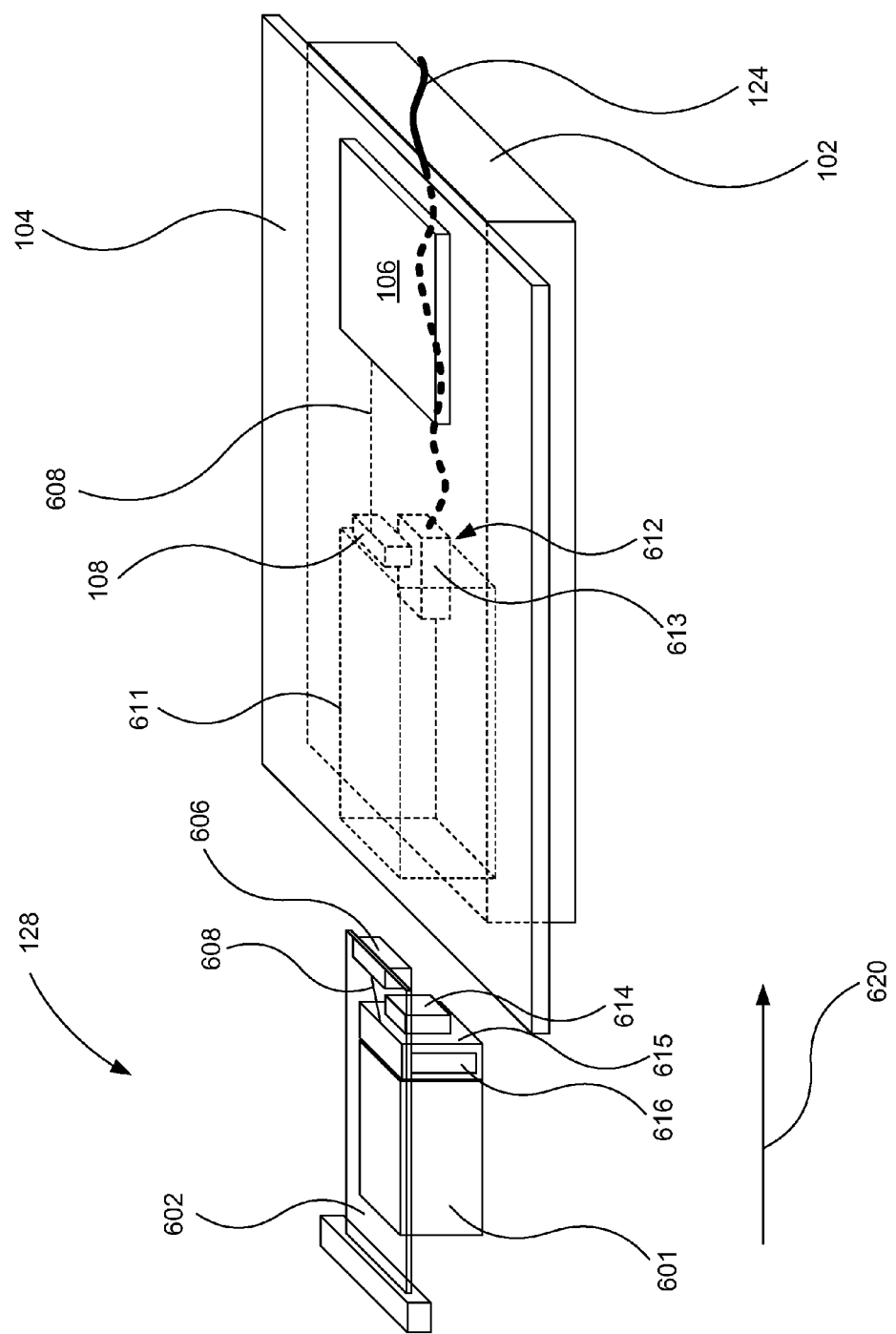
FIG. 6 is a perspective view of a pluggable module in a disengaged arrangement with respect to the electrical motherboard, according to another example of the principles described herein.

FIG. 6 is a perspective view of a pluggable module (128) in a disengaged arrangement with respect to a motherboard (104), according to another example of the principles described herein. The example of FIG. 6 is similar to FIG. 5, except that the pluggable module (128) is mounted under the motherboard (104). In the example of FIG. 6, the electrical coupling and optical coupling of the pluggable module (128) to the motherboard (104) are achieved along the same. The pluggable module (128) comprises a substrate (602), a support block (601) disposed on the substrate (602), a number of e/o engines (614), and a flex circuit (615) electrically coupled to the e/o engines (614). The number of e/o engines (614) depicted in FIG. 6 is one. However, any number of e/o engines (614) may be included within the pluggable module (128).

The pluggable module (128) may also comprise a heat sink (616) thermally coupled to the flex circuit (615). A number of conductive pathways (608) may be disposed on the substrate (602) to electrically couple the flex circuit (615) to electrical pluggable module connectors (108).

The motherboard (104) comprises a number of processing devices (106) electrically coupled to a number of electrical pluggable module connectors (108) via a number of conductive pathways (608). The electrical pluggable module connectors (108) are coupled to a pluggable module housing (611). Further, a ferrule array (612) comprising a number of ferrules (613) are coupled to the pluggable module housing (611). The number of ferrules (613) depicted in FIG. 6 is one. However, any number of ferrules (613) may be included within the pluggable module (128).

A number of waveguides (124) are optically coupled to the ferrules (613) to provide transmission of optical signals to and from the pluggable module (128). As described above, the waveguides (124) are embedded or formed within the OBL (102). The electrical pluggable module connector (108), conductive pathway (608), pluggable module housing (611), ferrule (613), and waveguide (124) of FIG. 6 are shown as dashed lines because they are disposed on the underside of the motherboard (104).

The pluggable module (128) is mounted to the pluggable module housing (611) by moving the pluggable module (128) into the pluggable module housing (611) in the direction of arrow (620). The pluggable module (128) is physically coupled to the pluggable module housing (611) via any number of coupling methods. In one example, an interference fit may be formed between the pluggable module (128) and the pluggable module housing (611). In another example, a coupling device located on the pluggable module (128) or the pluggable module housing (611) is used to mechanically connect the pluggable module (128) to the pluggable module housing (611). In this example, the coupling device may be, for example, clamps, clips, screws, and snaps, among others.

Once coupled to the motherboard (104), the pluggable module (128) receives optical signals from an outside source via the ferrule (613) of the ferrule array (612) and waveguide (124). The optical signals are converted into electrical signals by the e/o engines (614). The electrical signals are transmitted to the electrical pluggable module connectors (606) via the flex circuit (615) and conductive pathways (608). The electrical pluggable module connector (108) of the motherboard (104) receives the electrical signals from the electrical pluggable module connectors (606). The conversion of electrical signals from the motherboard (104) to an outside device is performed in reverse.

The pluggable module (128) of FIG. 6 allows for simultaneous optical and electrical coupling of the pluggable module (128) to the motherboard (104). Also, the optical and electrical coupling of the pluggable module (128) to the motherboard (104) occurs along the same axis. As depicted in FIG. 6, the pluggable module (128) is mounted on the underside of the motherboard (104). In another example, the pluggable module (128) is mounted on a side of the motherboard (104) opposite a number of other processing devices such as, for example, a processing device (106). The example of FIG. 6 provides for a configuration wherein the waveguides (124) are not located above the motherboard (104), but, instead run below the motherboard (104) and are embedded or formed within the OBL (102). In this manner, the waveguides (124) do not obstruct the flow of air across the processing devices (106), motherboard (104), or other heat-sensitive components.

Further, through implementation of the examples of FIG. 6, the top of the motherboard (104) is less cluttered. This allows technicians or other persons to access the various components located on the top side of the motherboard (104) more easily. Still further, having the waveguides (124) run under the motherboard (104) can reduce or eliminate human error. For example, if a user wishes to access the processing devices (106) located on the top of the motherboard (104), and if the waveguides (124) run above the motherboard (104), a technician may inadvertently destroy a number of waveguides (124). Thus, if the waveguides (124) do run above the motherboard (104), more rugged waveguides (124) would be used leading to higher costs in materials and implementation.

Figure 7:
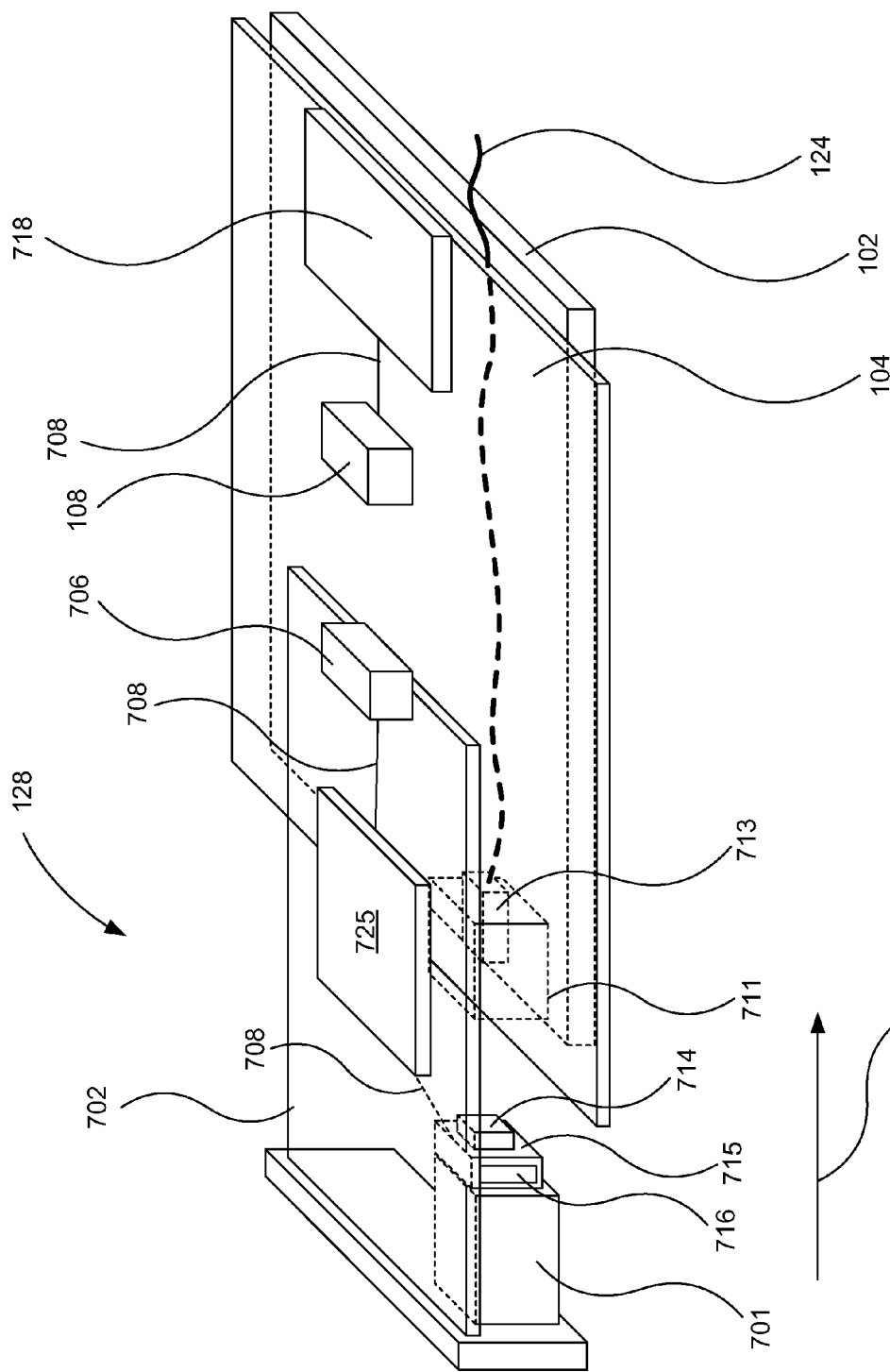
FIG. 7 is a perspective view of a pluggable module in a disengaged arrangement with respect to the electrical motherboard, according to still another example of the principles described herein.

FIG. 7 is a perspective view of a pluggable module (128) in a disengaged arrangement with respect to a motherboard (104), according to still another example of the principles described herein. FIG. 7 is similar to FIG. 6, except that the pluggable module (128) of FIG. 7 is electrically mounted above the motherboard (104) and optically mounted below the motherboard (104), with a leaf switch ASIC (725) electrically coupled to the pluggable module (128). In the example of FIG. 7, the electrical coupling and optical coupling of the pluggable module (128) to the motherboard (104) are achieved along the same axis.

The pluggable module (128) of FIG. 7 comprises a substrate (702), a support block (701) disposed on the substrate (702), a number of e/o engines (714), and a flex circuit (715) electrically coupled to the e/o engines (714). The number of e/o engines (714) depicted in FIG. 7 is one. However, any number of e/o engines (714) may be included within the pluggable module (128). In one example, the substrate (702) is a line card PCA. In FIG. 7, portions of the support block (701), flex circuit (715), e/o engine (714), and pluggable module housing (711) are depicted in using dashed lines because they are disposed on the underside of the substrate (702) as will be described in more detail below.

The pluggable module (128) may also comprise a heat sink (716) thermally coupled to the flex circuit (715). A number of conductive pathways (708) may be disposed on the substrate (702) to electrically couple the flex circuit (715) to a leaf switch ASIC (725) and the leaf switch ASIC (725) to an electrical pluggable module connector (706).

The motherboard (104) comprises a number of spine switch ASICs (718) electrically coupled to a number of electrical pluggable module connectors (108) via a number of conductive pathways (708). A ferrule (713) is coupled to a pluggable module housing (711). The number of ferrules (713) depicted in FIG. 7 is one. However, any number of ferrules (713) may be included within the pluggable module (128).

A number of waveguides (124) are optically coupled to the ferrules (713) to provide transmission of optical signals to and from the pluggable module (128). The electrical pluggable module connector (108), conductive pathway (708), pluggable module housing (711), ferrule (713), and waveguide (124) of FIG. 7 are shown as dashed lines because they are disposed on the underside of the motherboard (104).

The pluggable module (128) is mounted to the pluggable module housing (711) by moving the support block (701), e/o engine (714), flex circuit (715), and heat sink (716) into the pluggable module housing (711) in the direction of arrow (720). As described above in connection with FIG. 6, the pluggable module (128) is physically coupled to the pluggable module housing (711) via any number of coupling methods. In one example, an interference fit may be formed between the pluggable module (128) and the pluggable module housing (711). In another example, a coupling device located on the pluggable module (128) or the pluggable module housing (711) is used to mechanically connect the pluggable module (128) to the pluggable module housing (711). In this example, the coupling device may be, for example, clamps, clips, screws, and snaps, among others.

Once coupled to the motherboard (104), the pluggable module (128) receives optical signals from an outside source via the ferrule (713) and waveguide (124). The optical signals are converted into electrical signals by the e/o engines (714). The electrical signals are transmitted to the electrical pluggable module connector (706) via the flex circuit (715) and conductive pathways (708). The electrical pluggable module connector (108) of the motherboard (104) receives the electrical signals from the electrical pluggable module connector (706). The conversion of electrical signals from the motherboard (104) to an outside device is performed in reverse.

As described above, the pluggable module (128) of FIG. 7 allows for simultaneous optical and electrical coupling of the pluggable module (128) to the motherboard (104). Also, the optical and electrical coupling of the pluggable module (128) to the motherboard (104) occurs along the same axis. Still further, in the example of FIG. 7 the optical coupling of the pluggable module (128) to the ferrule (713), and the electrical coupling of the pluggable module (128) to the electrical pluggable module connector (108) occur on opposite sides of the motherboard (104).

As depicted in FIG. 7, a portion of the pluggable module (128) is mounted on the underside of the motherboard (104). In another example, the e/o engine (714) of the pluggable module (128) is mounted on a side of the motherboard (104) opposite a number of other processing devices such as, for example, the spine switch ASIC (718). The example of FIG. 7 provides for a configuration wherein the waveguides (124) are not located above the motherboard (104), but, instead run below the motherboard (104) and are embedded or formed within the OBL (102). In this manner, the waveguides (124) do not obstruct the flow of air across the spine switch ASICs (718), motherboard (104), or other heat-sensitive components. Further, the leaf switch ASIC (725) of FIG. 7 is electrically coupled to the motherboard (104) on the same side of the motherboard (104) that comprises a number of other processing devices such as, for example, the spine switch ASIC (718). In this configuration, the leaf switch ASIC (725) is cooled along with the spine switch ASIC (718). Further, through implementation of the examples of FIG. 7, the top of the motherboard (104) is less cluttered, allows access to the various components located on the top side of the motherboard (104) more easily, reduces or eliminates human error, and is more cost efficient with regard to materials and implementation as described above.

FIGS. 5, 6, and 7 disclose examples of various components and modules that may be incorporated into the computing device (100). However, any subcomponent or component may be applicable in light of the above. Further, in one example, the components and modules coupled to the OBL (102) and motherboard (104) may themselves comprise an OBL. In this example, the OBLs of the components and modules optically couple to the main OBL (102), and send optical signals via the main OBL (102) to components associated with the main OBL (102). In this example, the optical coupling of the component and module OBLs to the main OBL (102) may be achieved through a blind mate connector.

Figure 8:
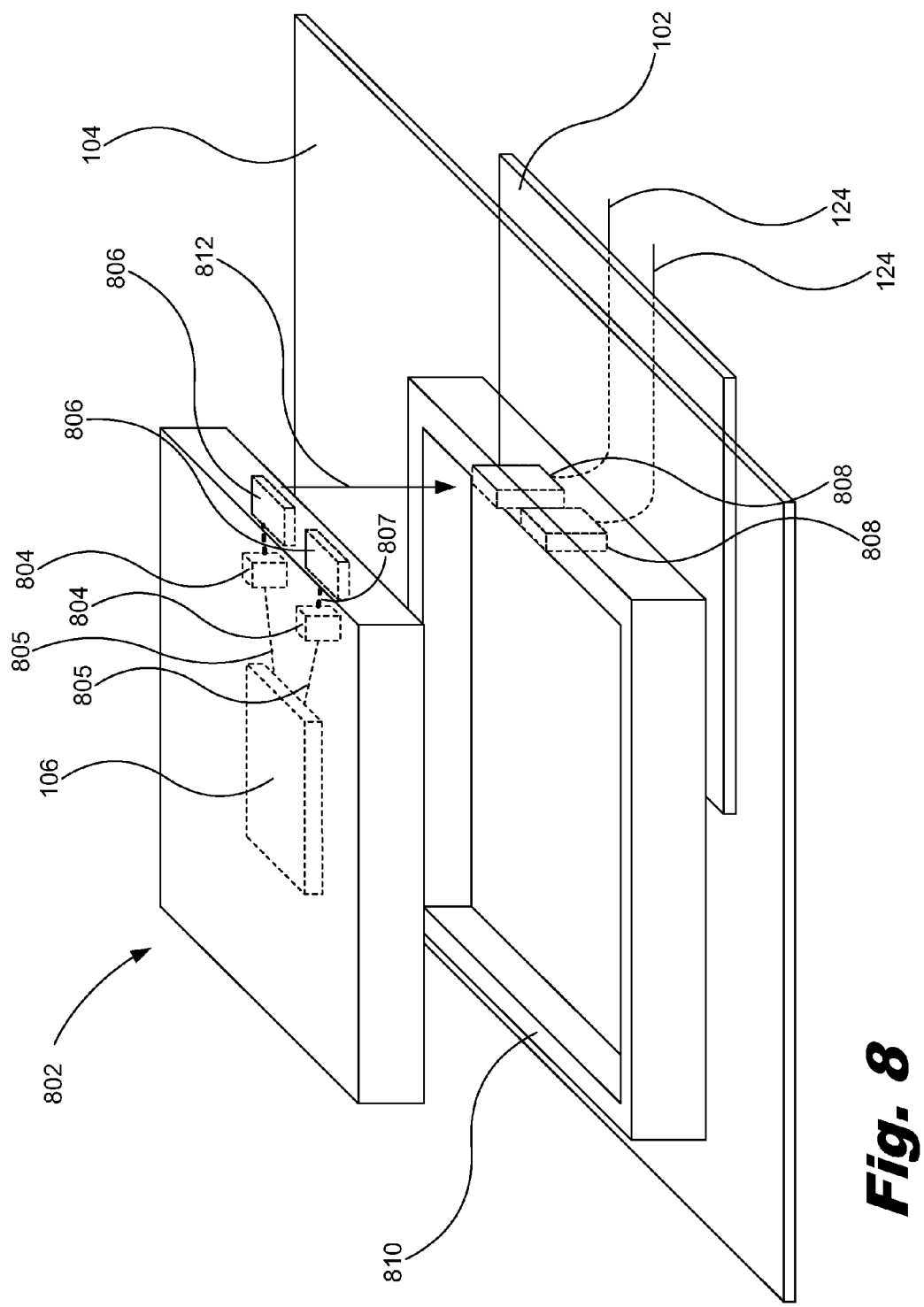
FIG. 8 is a perspective view of a processing device package optically coupled to an OBL, according to still another example of the principles described herein.

FIG. 8 is a perspective view of a processing device package (802) optically coupled to an OBL (102), according to an example of the principles described herein. The processing device package (802) of FIG. 8 comprises a processing device (106) such as, for example, an ASIC electrically coupled to a number of e/o engines (804) via a number of conductive pathways (805). The e/o engines (804) are optically coupled to a number of optical package connectors (806) via a number of waveguides (807). The optical package connectors (806) transmit optical signals between the e/o engines (804) and a number of ferrules (808) that protrude from the OBL (102) and motherboard (104) into a processing device package housing (810). The motherboard (104) of FIG. 8 is depicted transparently in order to depict the waveguides (124) within the OBL (102). The ferrules (808) transmit optical signals between the optical package connectors (806) and a number of waveguides (124) embedded or formed within the OBL (102). In this manner, electrical signals from the processing device (106) are converted into optical signals by the e/o engines (804), and transmitted to the OBL (102) via the optical package connectors (806), ferrules (808), and waveguides (124). These optical signals may then be transmitted to other components within the computing device (100) or to an external computing device. The optical package connectors (806) may comprise optical lenses.

When the processing device package (802) is engaged with the processing device package housing (810) in the direction indicated by arrow (812), the optical package connectors (806) optically couple with the ferrules (808). In one example, the optical package connectors (806) and a portion of the processing device package (802) that houses the ferrules (808) are blind-mate connectors.

Figure 9:
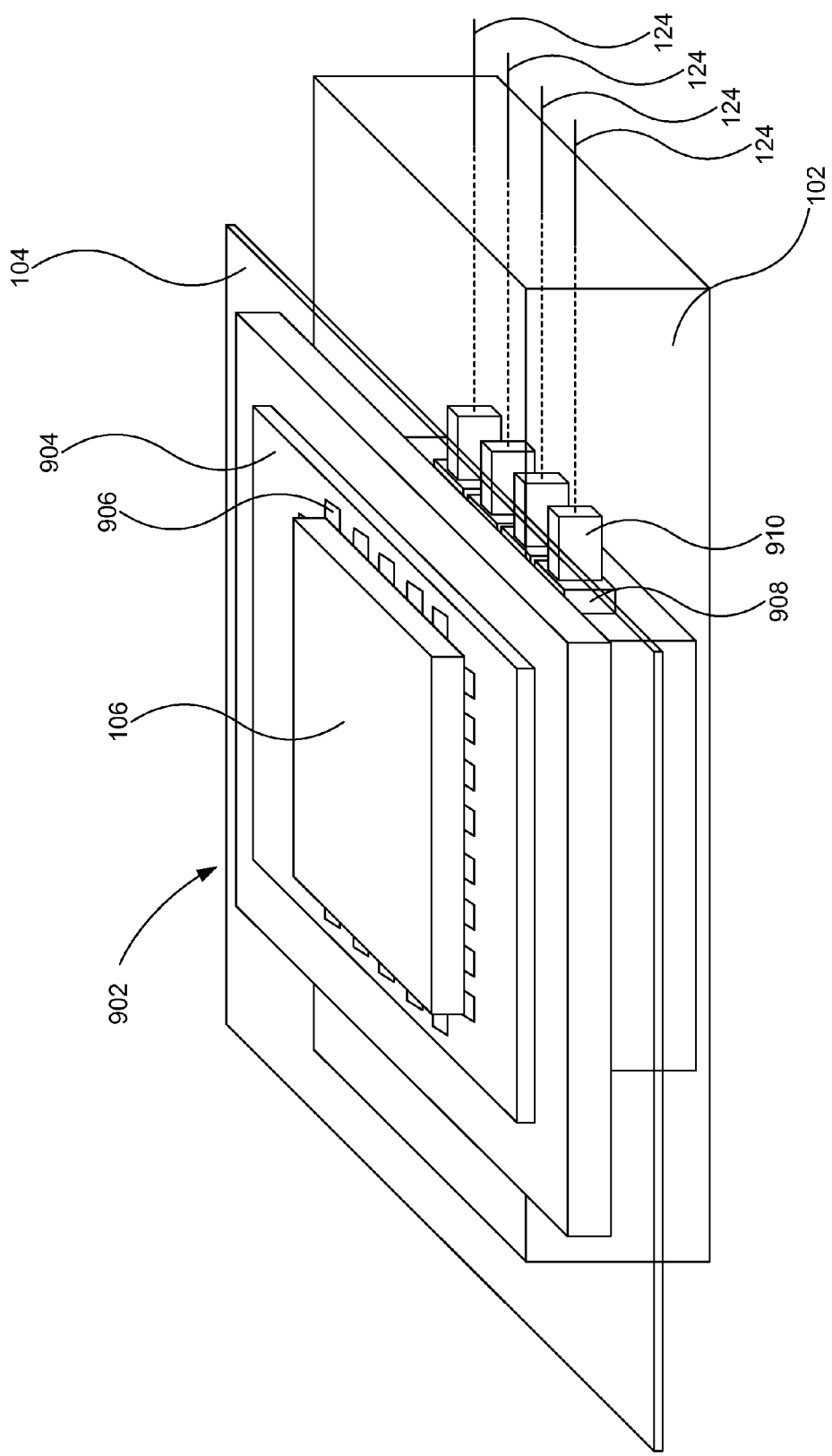
FIG. 9 is a perspective view of a processing device package optically coupled to an OBL, according to another example of the principles described herein.

FIG. 9 is a perspective view of a processing device package (902) optically coupled to an OBL (102), according to another example of the principles described herein. The processing device package (902) of FIG. 9 comprises a processing device (100) such as, for example, a microprocessor, or a switch ASIC. The processing device (106) is coupled to a dielectric base (904). The dielectric base (904) comprises a number of conductive pathways (906) running throughout the dielectric base (904) that electrically couple the processing device (106) to the motherboard (104) and a number of e/o engines (908). In one example, the conductive pathways (906) of the dielectric base (904) run throughout the dielectric base (904) in the direction of the x-axis, y-axis, z-axis, or a combination thereof. Further, in one example, the dielectric base (904) may comprise a number of mating features to ensure that the dielectric base (904) properly aligns with the OBL (102) and ferrules (910). Still further, the dielectric base (904) and OBL (102) may comprise coupling devices such as, for example, magnet pairs, to couple the dielectric base (904) to the OBL (102).

As depicted in FIG. 9, the conductive pathways (906) electrically couple the processing device (106) to the e/o engines (908) located below the processing device (106) and the motherboard (104). Thus, a recess is defined in the motherboard (104) and OBL (102) to accommodate the dielectric base (904) and allow for the transmission of electrical signals from the processing device (106) to the e/o engines (908). The e/o engines (908) are optically coupled to a number of ferrules (910) embedded within the OBL (102). A number of waveguides (124) embedded or formed within the OBL (102) are optically coupled to the ferrules (910). The motherboard (104) and OBL (102) of FIG. 9 are depicted transparently in order to depict the waveguides (124) within the OBL (102). In this manner, electrical signals from the processing device (106) are converted into optical signals by the e/o engines (908), and transmitted to the OBL (102) via ferrules (910) and waveguides (124). These optical signals may then be transmitted to other components within the computing device (100) or to an external computing device.

Figure 10:
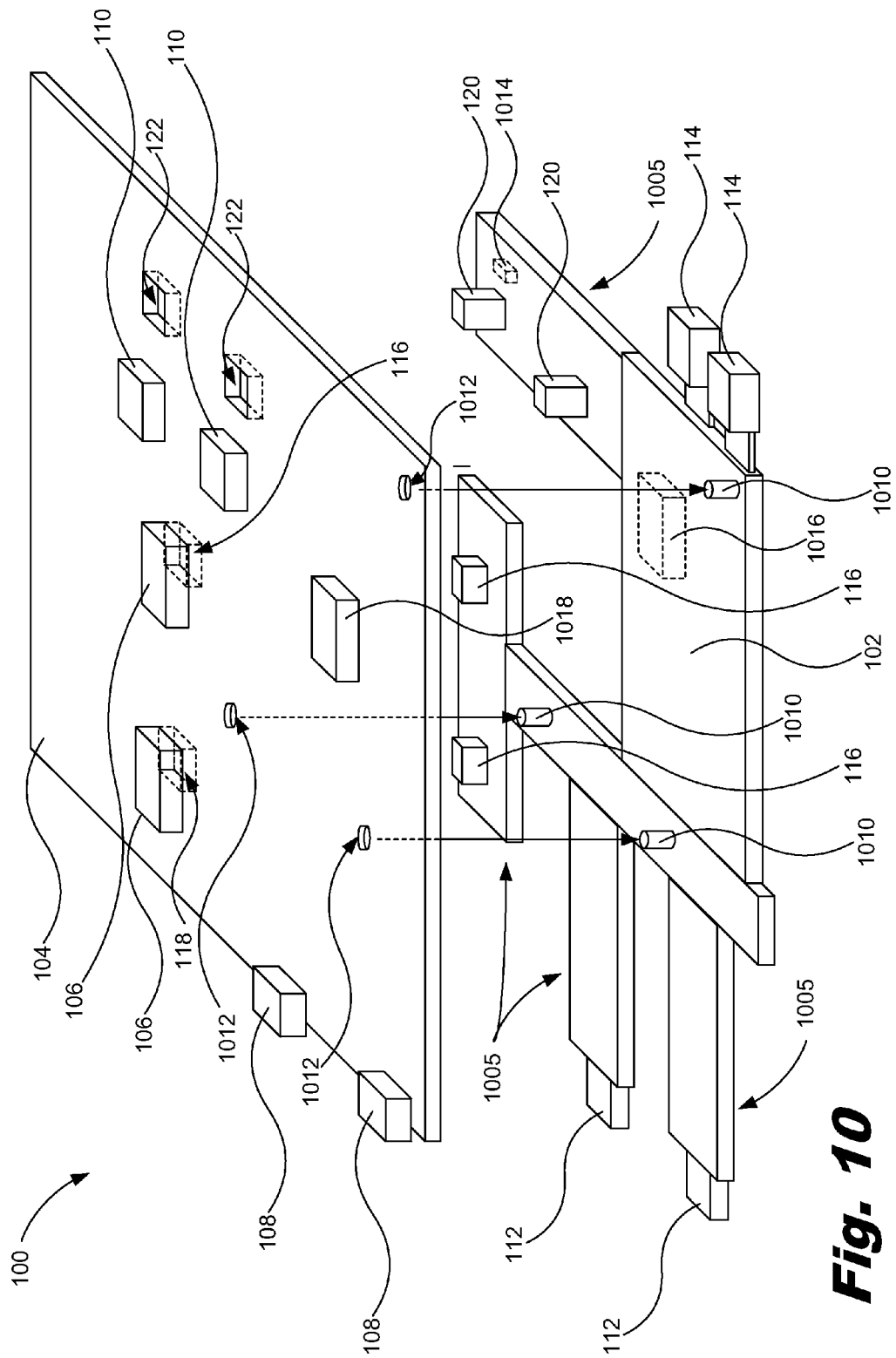
FIG. 10 is an isometric exploded diagram of an OBL and an electrical motherboard of a computing device, according to another example of the principles described herein.

FIG. 10 is an isometric exploded diagram of an OBL (102) and motherboard (104) of a computing device (100), according to another example of the principles described herein. The OBL (102) and motherboard (104) of FIG. 10 comprises many of those components described above in connection with FIGS. 1 through 4. However, the OBL (102) of FIG. 10 comprises a number of OBL arms (1005) whereas the OBL (102) of FIGS. 1 through 4 comprises a planar configuration. The arms (1005) of the OBL (102) may be implemented to provide mechanical clearance below the motherboard (104), for example for mounting components or support structure on the underside of the motherboard (104). Further, the arms (1005) serve to assist a technician in knowing the orientation of the OBL (102) with respect to the motherboard (104).

The OBL (102) and motherboard (104) of FIG. 10 also include a number of position referencing posts (1010) coupled or formed on the OBL (102) and corresponding position referencing voids (1012) defined in the motherboard (104). Alignment of the OBL (102) with respect to the motherboard (104) may be difficult for a user or technician to achieve. Alignment of various pairing components of the computing device (100) such as, for example, the electrical pluggable module connectors (108) and the optical pluggable module connectors (112); optical processing device socket connectors (116) and the processing device socket voids (118); and the optical mezzanine socket connectors (120) and the mezzanine socket voids (122) are achieved before the OBL (102) and motherboard (104) are engagable. Further, alignment of these components is achieved before the mezzanine cards (FIG. 4, 126) and pluggable modules (FIG. 4, 128) can be engaged with the OBL (102) and motherboard (104).

The position referencing posts (1010) and their corresponding position referencing voids (1012) assist in the alignment of the OBL (102) with respect to the motherboard (104). As depicted in FIG. 10, the position referencing posts (1010) and position referencing voids (1012) are placed in corresponding positions. When engaged with their respective position referencing voids (1012), the position referencing posts (1010) ensure proper alignment of the OBL (102), motherboard (104), and their various components. In one example, the position referencing posts (1010) formed on the OBL (102) and their corresponding position referencing voids (1012) on the motherboard (104) are positioned strategically to prevent interfering with conductive pathways on the motherboard (104) and coupling devices used to secure the motherboard (104) and the OBL (102) with a housing of the computing device (100).

The OBL (102) of FIG. 10 further comprises an electrical interface (1014) and a memory device (1016). The motherboard (104) further comprises a controller (1018). In one example, the memory device (1016) is a non-volatile memory device. Configuration data associated with the OBL (102) is stored on the memory device (1016). This configuration data may include, for example, data describing the number of optical connectors in the OBL (102), the types of optical connectors in the CBL (102), the number of waveguides (124) embedded or formed within the OBL (102), the routing of the waveguldes (124) within the OBL (102), the types of waveguides (124) within the OBL (102), waveguide (124) topologies, model numbers associated with the OBL (102) or other components, serial numbers associated with the OBL (102) or other components, information about the manufacturer of the OBL (102) or other components, the date of manufacturing of the OBL (102) or other components, the location of manufacturing of the OBL (102) or other components, and combinations thereof.

The memory device (1016) is electrically coupled to the controller (1018) on the motherboard (104) via the electrical interface (1014) on the OBL and an associated electrical interface on the motherboard (not shown). When associating the OBL (102) with the motherboard (104), the controller (1018) of the computing device (100) may obtain the configuration data stored on the memory device (1016), and use that configuration data to control the transmission of electrical and optical signals throughout the computing device (100). In this manner, an OBL (102) may be designed for a specific computing device (100), and that computing device (100) may associate the motherboard (104) with that particular OBL (102) when the OBL (102) is optically and electrically coupled to the motherboard (104).

In another example, the memory device (1016) may contain data associated with the motherboard (104). For example, the memory device (1016) may contain data regarding the topology of the motherboard (104). In this example, the controller (1018) may receive the data associated with the motherboard (104) and use that data to control the transmission of electrical signals throughout the motherboard (104), optical signals throughout the OBL (102), optical and electrical signals between the motherboard (104) and OBL (102), and generally throughout the computing device (100).

As described above, the OBL (102) may comprise a number of cooling channels (302) defined within the OBL (102) to cool various components embedded within the OBL (102). In the example of FIG. 10, the cooling channels (302) may be used to cool the electrical interface (1014) and memory device (1016).

Figure 11:
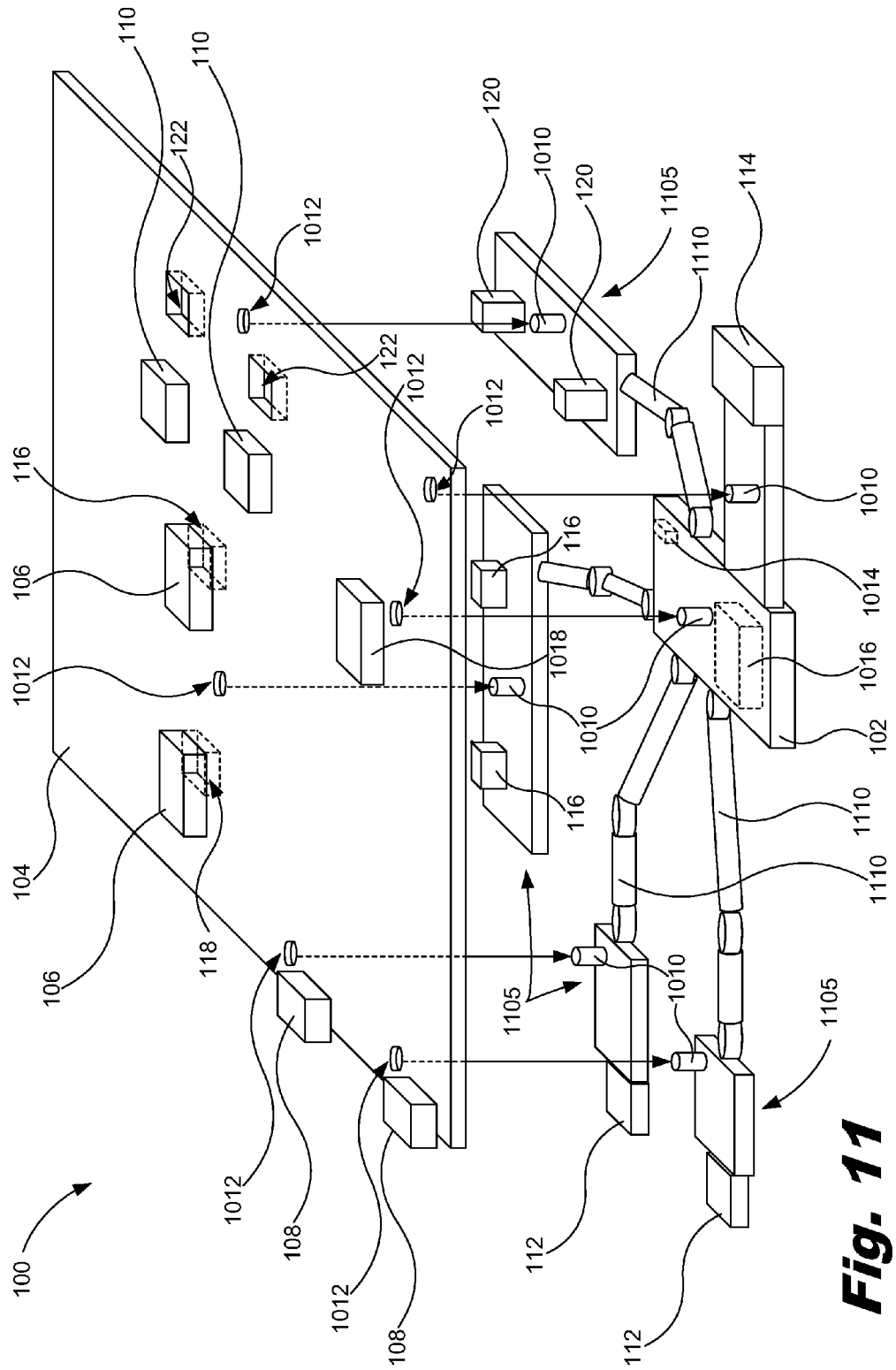
FIG. 11 is an isometric exploded diagram of an OBL and an electrical motherboard of a computing device in which the OBL comprises a number of adjustable waveguides, according to an example of the principles described herein.
Figure 12:
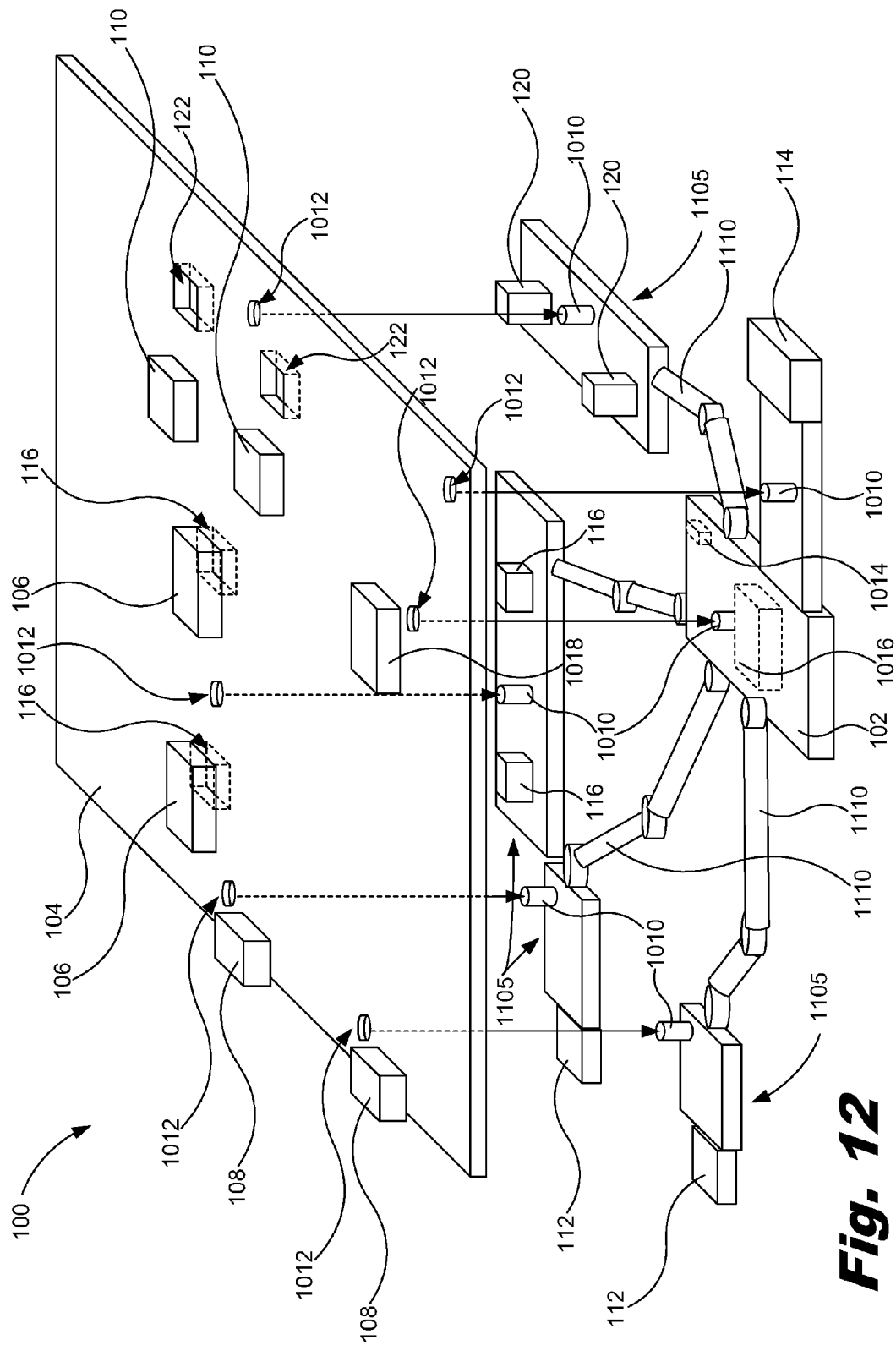
FIG. 12 is an isometric exploded diagram of the OBL and the electrical motherboard of FIG. 11 implemented in a different configuration, according to an example of the principles described herein.

FIG. 11 is an isometric exploded diagram of an OBL (102) and motherboard (104) of a computing device (100) in which the OBL (102) comprises a number of adjustable arms (1105), according to an example of the principles described herein. FIG. 12 is an isometric exploded diagram of the OBL (102) and motherboard (104) of FIG. 11 implemented in a different configuration, according to an example of the principles described herein. The OBL (102) and motherboard (104) of FIGS. 11 and 12 comprises many of the components described above in connection with FIGS. 1 through 4 and 10. FIGS. 11 and 12, however, allow for the same OBL (102) to be used for different motherboard (104) configurations.

The adjustable arms (1105) of the OBL (102) may be implemented to reduce the materials used in and the weight of the computing device (100). Further, the arms (1105) serve to assist a technician in knowing the orientation of the OBL (102) with respect to the motherboard (104). Even still further, each of the arms (1105) comprises an adjustable optical conduit (1110). The adjustable optical conduits (1110) allow for optical signals to be transmitted to, for example, the optical pluggable module connectors (112), optical backplane connectors (114), optical processing device socket connectors (116), and optical mezzanine socket connectors (120), and, thereafter, to other components within the computing device (100). The adjustable arms (1105) and adjustable optical conduits (1110) may be hinged, flexible, or telescopic so that the position of the adjustable arms (1105) and adjustable optical conduits (1110) can be altered to accommodate for different motherboard (104) configurations.

A number of waveguides are embedded or formed with the adjustable optical conduits (1110). In one example, the waveguides are optical fibers. In this example, the adjustable optical conduits (1110) are hinged, and the optical fibers run through the hinged portions of the adjustable optical conduits (1110). In another example, the waveguides embedded or formed in the adjustable optical conduits (1110) may be rigid or substantially rigid types of waveguides. In this example, the hinged portions of the adjustable optical conduits (1110) couple a number of the rigid or substantially rigid waveguides. In still another example, a group of optical fibers may be embedded within the adjustable optical conduits (1110). The adjustable optical conduits (1110) provide better protection for the waveguides such as, for example, optical fibers, than flexible fibers with protected sheathing.

Pointing to FIGS. 11 and 12, the adjustable optical conduits (1110) may be adjusted to fit different a number of motherboards with different configurations and topologies. For example, the motherboard (104) of FIG. 11 comprises a topology and number of position referencing voids (1012) that are positioned on the motherboard (104) that is different from the topology of the motherboard (104) of FIG. 12. For example, the left two position referencing voids (1012) and their respective electrical pluggable module connectors (108) are positioned in two different areas in the motherboards (104) of FIGS. 11 and 12. The adjustable optical conduits (1110) may be adjusted so that the adjustable optical conduits' (1110) and their position referencing posts (1010) can mate with the position referencing voids (1012) of the motherboards (104).

In one example, the OBLs (102) with adjustable optical conduits (1110) can be used to accommodate the different motherboard (104) designs. In this manner, the same OBL (102) can be used by making the optical fiber routing throughout the OBL (102) to be adaptable for the different motherboard designs and adjusting the position of the arms (1105) to optically couple with the motherboard (104).

Figure 13:
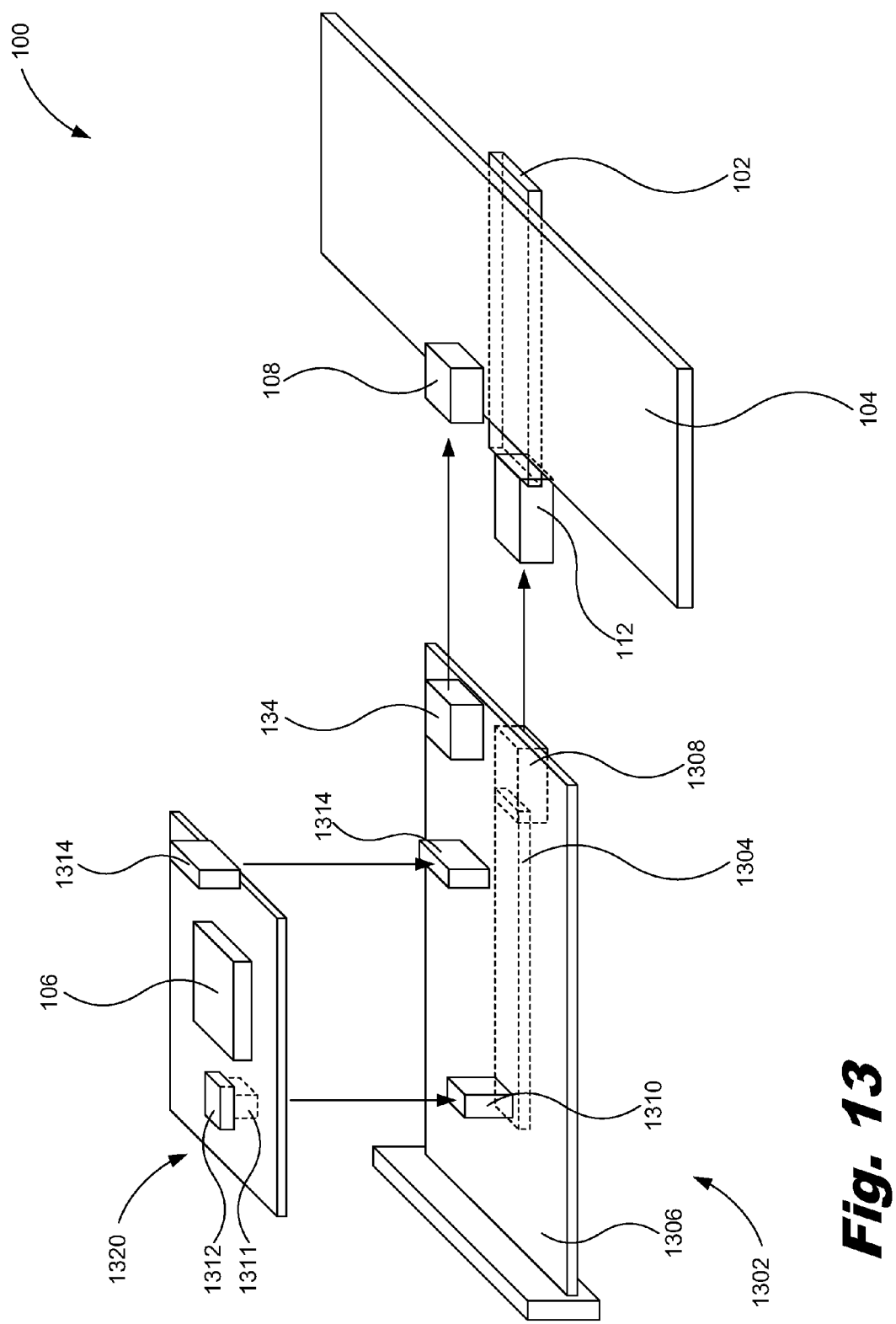
FIG. 13 is a perspective view of a pluggable module in a disengaged arrangement with respect to the electrical motherboard in which the pluggable module comprises an OBL segment, according to an example of the principles described herein.

FIG. 13 is a perspective view of a pluggable module (1302) in a disengaged arrangement with respect to the motherboard (104) in which the pluggable module (1302) comprises an OBL segment (1304), according to an example of the principles described herein. In this example, the pluggable module (1302) is a carrier for the mezzanine card (1302). The motherboard (104) comprises a number of electrical pluggable module connectors (108) along with any processing devices or other components as described above. A main OBL (102) associated with the motherboard (104) may comprise comprises a number of optical pluggable module connectors (112) to optically couple with the pluggable module (1302).

The pluggable module (1302) comprises a substrate (1306), and an OBL segment (1304). The OBL segment (1304) comprises a number of optical pluggable module connectors (1308) and a number of optical mezzanine connectors (1310) to optically couple a number of mezzanine cards (1320) to the pluggable module (1302). In one example, the optical mezzanine connectors (1310) may be optical blind-mate connectors. The optical mezzanine connector (1310) of FIG. 13 extends through the substrate (1306) from below the substrate (1306).

As described above, the main OBL (102) and OBL segment (1304) may have waveguides (124) embedded or formed within the main OBL (102) and OBL segment (1304). In this manner, optical signals may be transmitted from the main OBL (102), through the optical pluggable module connectors (112, 1308), to the optical mezzanine connector (1310).

Optical signals from the main OBL (102) and OBL segment (1304) are received at the mezzanine card (1320) via an optical mezzanine connector (1311) and e/o engine (1312). The optical signals transmitted to the mezzanine card (1320) are converted into electrical signals via the e/o engine (1312). The electrical signals are then transferred to a number of processing devices (106) coupled to the mezzanine card (1320). The electrical signals, after being processed by the processing devices (106), are transmitted to an electrical mezzanine connector (1314) for transmission to the pluggable module (1302).

The pluggable module (1302) further comprises an electrical mezzanine connector (1314) to electrically couple the electrical mezzanine connector (1314) of the mezzanine card (1320) to the pluggable module (1302). Electrical signals transmitted to the electrical mezzanine connector (1314) of the pluggable module (1302) from the electrical mezzanine connector (1314) of the mezzanine card (1320) are then transmitted to the electrical pluggable module connector (134) that electrically couples to the pluggable module (1302) to the motherboard (104). In one example, the pluggable module (1302) with the mezzanine card (1320) is hot swappable.

When the mezzanine card (1320) is electrically and optically coupled to the pluggable module (1302), and the pluggable module (1302) is electrically and optically coupled to the main OBL (102) and motherboard (104), electrical and optical signals may be transferred between these components and processed by a number of processing devices (106). The computing device (100) of FIG. 13 provides for an OBL segment (1304) to be associated with a pluggable module (1302). In this example, the OBL segment (1304) carries optical signals to a number of processing devices (106) so that the capabilities of the computing device (100) may be increase and enhanced without reconfiguring or replacing the main OBL (102) or motherboard (104).

The specification and figures describe an optical base layer (OBL). The OBL comprises a number of waveguides disposed inside the OBL, and a number of socket connectors formed on the optical base layer and extending through a motherboard to optically couple the OBL to a number of components disposed on the motherboard. This OBL may have a number of advantages, including the following. By protecting optical fibers within the OBL, higher system reliability is enabled within the computing device. By routing the waveguides under the motherboard and within the OBL, air flow blockage caused by the optical fibers that may otherwise run above the motherboard is reduced or eliminated. Further, optical fibers embedded within the OBL can be manufactured with minimum sheathing because they are fully contained within the OBL. Thus, lower cost materials are used, and the optical fibers occupy a smaller volume.

Further, because an entire OBL is a full assembly, the computing device is easier to assemble, service, and upgrade. Along these lines, manufacturers can test an entire OBL before shipping an OBL. During manufacturing, testing or diagnostic cards may be used to ensure basic connectivity and operation conforms to manufacturing standards. This same testing can be performed during field installation or service as well as in the factory during assembly or service.

Still further, by hiding the waveguide routing complexity from end users, overall system assembly looks simple. Even still further, the same OBL can be used for mezzanine or front pluggable adapter cards with e/o engines or e/o engines co-packaged with processing devices such as ASICs.

Further, the same OBL structure with different waveguide routing can be used for the same motherboard to enable various system configurations at minimum development cost. Even still further, different OBL designs, with different front pluggable adapter optical connectors and backplane optical connectors but with compatible through-motherboard optical connectors, can be used for the same motherboard to enable various system configurations at minimum development cost. Even still further, by making the optical connectors' positions to be flexibly placed as in the case of FIGS. 11 and 12, an adaptable OBL can be used for different motherboard designs. Because full configuration of an OBL is described in a memory device within the OBL, the computing device's system management may be easily enabled.

The preceding description has been presented to illustrate and describe examples of the principles described. This description is not intended to be exhaustive or to limit these principles to any precise form disclosed. Many modifications and variations are possible in light of the above teaching.

What is claimed is:

1. An optical base layer (OBL), comprising:
 a number of waveguides disposed inside the OBL;
 a number of socket connectors formed on the OBL and extending through a motherboard to optically couple the OBL to a number of components disposed on the motherboard; and
 a memory device embedded within the OBL, in which the memory device stores data associated with the OBL.

2. The OBL of claim 1, further comprising:
a number of position referencing posts formed on the OBL, and
a number of position referencing voids defined in the motherboard,
in which the engagement of the position referencing posts with the position referencing voids align a number of components disposed on the OBL with a number of components disposed on the motherboard.

3. The OBL of claim 2, in which the position referencing posts and the position referencing voids align a number of electrical connectors on the motherboard with a number of optical connectors on the OBL to optically couple to the OBL and electrically couple to the motherboard a number of components.

4. The OBL of claim 3, in which the components comprise mezzanine cards, pluggable modules, processing device packages, or combinations thereof.

5. The OBL of claim 1, in which the socket connectors align a number of components disposed on the OBL with a number of components disposed on the motherboard.

6. The OBL of claim 1, in which the number of waveguides are hollow metallic waveguides, planar waveguides, channel waveguides, ridge waveguides, dielectric waveguides, optical glass fibers, optical plastic fibers, optical buses, polymer waveguides, rigid waveguides, flexible waveguides, molded waveguides, or combinations thereof.

7. The OBL of claim 1, in which the data associated with the OBL comprises data describing the number of optical connectors in the OBL, data describing the types of optical connectors in the OBL, data describing the number of waveguides within the OBL, data describing the routing of the waveguides within the OBL, data describing the types of waveguides within the OBL, data describing waveguide topologies, data describing model numbers associated with the OBL, data describing model numbers associated with components within the OBL, data describing serial numbers associated with the OBL, data describing serial numbers associated with components within the OBL, data describing the manufacturer of the OBL, data describing the manufacture of components within the OBL, data describing the date of manufacturing of the OBL, data describing the date of manufacture of components within the OBL, data describing the location of manufacturing of the OBL, data describing the location of manufacturing of components within the OBL, or combinations thereof.

8. The OBL of claim 1, further comprising a controller disposed on the motherboard to obtain the data associated with the OBL stored on the memory device and use the data associated with the OBL to control the transmission of electrical and optical signals between the OBL and motherboard.

9. The OBL of claim 1, further comprising an electrical interface within the OBL to electrically couple the memory device in the OBL to the controller on the motherboard.

10. The OBL of claim 1, further comprising a number of channels defined within the OBL to cool a number of components within the OBL.

11. The OBL of claim 1, further comprising a number of conductive pathways embedded within the OBL to provide power to a number of components within the OBL.

12. The OBL of claim 1, in which the OBL comprises a rigid material, a semi-flexible material, a flexible material, or combinations thereof.

13. A computing device comprising:
a main optical base layer (OBL) comprising:
    a number of waveguides disposed inside the main OBL;
    a number of socket connectors formed on the main OBL and extending through a motherboard to optically couple the main OBL to a number of components disposed on the motherboard; and
    a memory device embedded within the main OBL, in which the memory device stores data associated with the main OBL; and
a number of OBL segments optically coupled to the main OBL.

14. An optical base layer (OBL), comprising:
a number of adjustable arms,
a number of waveguides disposed within the adjustable arms, in which the position of the adjustable arms are altered to accommodate different motherboard configurations; and
a memory device embedded within the OBL, in which the memory device stores data associated with the OBL.

* * * * *